(12) United States Patent
Gisolfi

(10) Patent No.: US 7,954,115 B2
(45) Date of Patent: May 31, 2011

(54) MASHUP DELIVERY COMMUNITY PORTAL MARKET MANAGER

(75) Inventor: Daniel A. Gisolfi, Hopewell, NY (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 11/954,049

(22) Filed: Dec. 11, 2007

(65) Prior Publication Data

US 2009/0150902 A1    Jun. 11, 2009

(51) Int. Cl.
*G06F 13/00* (2006.01)

(52) U.S. Cl. ......... 719/320; 719/330; 715/201; 709/201

(58) Field of Classification Search .................. 719/320, 719/330; 709/201; 715/201
See application file for complete search history.

(56) References Cited

U.S. PATENT DOCUMENTS

| | | | |
|---|---|---|---|
| 2007/0100844 A1 | 5/2007 | Buttner et al. | 707/100 |
| 2007/0157077 A1 | 7/2007 | Gibson et al. | 715/513 |
| 2008/0222599 A1 * | 9/2008 | Nathan et al. | 717/107 |
| 2009/0138937 A1 * | 5/2009 | Erlingsson et al. | 726/1 |
| 2009/0150806 A1 * | 6/2009 | Evje et al. | 715/762 |

OTHER PUBLICATIONS

Merrill, Duane; Mashups: The New Breed of Web App; Aug. 8, 2006; pp. 1-9.

* cited by examiner

*Primary Examiner* — Andy Ho
(74) *Attorney, Agent, or Firm* — Justin M. Dillon; Ortiz & Lopez, PLLC

(57) ABSTRACT

A computer-implementable method and system for managing a mashup web-based community portal. A network-based community portal having a mashup platform integrated therewith can be provided and one or more pre-negotiated bartering agreements designated, in response to a particular user input by one or more users of the network-based community portal. A management module (e.g., a "Market Manager") can be associated with the network-based community portal in order to permit the users of the network-based community portal to describe to the mashup platform the pre-negotiated bartering agreement(s), in order to permit the network-based community portal to manage the utilization of mashup applications associated with the mashup platform and one or more widget contained by the mashup applications.

20 Claims, 4 Drawing Sheets

MASHUP DELIVERY COMMUNITY PORTAL MARKET MANAGER

TECHNICAL FIELD

Embodiments are generally related to data-processing systems and methods. Embodiments also relate in general to the field of computers and similar technologies, and in particular to software utilized in this field. In addition, embodiments relate to web-based mashups and the management thereof.

BACKGROUND OF THE INVENTION

A new breed of Web-based data integration applications is sprouting up all across the Internet. Colloquially termed mashups, their popularity stems from the emphasis on interactive user participation and the monster-of-Frankenstein-like manner in which they aggregate and stitch together third-party data. The sprouting metaphor is a reasonable one; a mashup Web site is characterized by the way in which it spreads roots across the Web, drawing upon content and functionality retrieved from data sources that lay outside of its organizational boundaries.

This vague data-integration definition of a mashup certainly is not a rigorous one. A good insight as to what makes a mashup is to took at the etymology of the term: it was borrowed from the pop music scene, where a mashup is a new song that is mixed from the vocal and instrumental tracks from two different source songs (i.e., usually belonging to different genres). Like these songs, a mashup is an unusual or innovative composition of content (e.g., often from unrelated data sources), made for human (i.e., rather than computerized) consumption.

So, what might a mashup look like? The ChicagoCrime.org Web site is a great intuitive example of what's called a mapping mashup. One of the first mashups to gain widespread popularity in the press, the Web site mashes crime data from the Chicago Police Department's online database with cartography from Google Maps. Users can interact with the mashup site, such as instructing it to graphically display a map containing pushpins that reveal the details of all recent burglary crimes in South Chicago. The concept and the presentation are simple, and the composition of crime and map data is visually powerful.

Mashups thus represent an exciting genre of interactive Web applications that draw upon content retrieved from external data sources to create entirely new and innovative services. They are a hallmark of the second generation of Web applications informally known as Web 2.0. This introductory article explores what it means to be a mashup, the different classes of popular mashups constructed today, and the enabling technologies that mashup developers leverage to create their applications. Additionally, you'll see many of the emerging technical and social challenges that mashup developers face.

In the Web 2.0 era, software components known as widgets (or gadgets) are becoming the focus of a component based programming model. These Widgets, which encapsulate web services (e.g., REST, SOAP, XMLRPC, etc) and marry the resulting content with new rich interactive user interfaces, are targeted for use by less skilled users (e.g., non-programmers) to create new situational applications or mashups. A mashup can be thought of as a web application that combines data from more than one source into a single integrated tool; an example is the use of cartographic data from Google Maps to add location information to real-estate data from Craigslist, thereby creating a new and distinct web service that was not originally provided by either source. Google, for example, is developing Google Gadgets for their online Google Portal, and Microsoft has developed gadgets for its Windows Live portal application. IBM, for example, has recently made an entry into this arena with its Mashup Maker technology, which is referred to as QEDWiki.

Before a mashup ecosystem can mature around a production and consumption of such Widgets, content providers need to realize some sort of bartering systems that will support a business justification for entry into this evolving marketplace. In order for a Widget Content Provider to justify an investment into this space, such an entity needs a platform whereby their widgets can be provisioned for consumption (e.g., for fee or trade) by mashup assemblers and consumers. The concept of a Mashup Delivery Community Portal reflects the notion of a Service Provider platform for connecting Mashup Consumers, Mashup Assemblers and Widget Providers. A Market Manager, for example, represents the concept of a software component within a Service Providers Mashup Delivery Community Portal (MDCP) whereby community participants can describe to the mashup platform pre-negotiated bartering agreements. These agreements can be then utilized to assist the Mashup Delivery Community Portal in managing the utilization of mashup applications and the widgets they contain.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for object profiling.

It is an additional aspect of the present invention to provide for an improved method, system and computer-usable medium for managing a web-based mashup.

The aforementioned aspects and other objectives and advantages can now be achieved as described herein. A computer-implementable method and system for managing a mashup web-based community portal. In general, a network-based community portal having a mashup platform integrated therewith can be provided and one or more pre-negotiated bartering agreements designated, in response to a particular user input by one or more users of the network-based community portal. A management module (e.g., a "Market Manager") can be associated with the network-based community portal in order to permit the users of the network-based community portal to describe to the mashup platform the pre-negotiated bartering agreement(s), in order to permit the network-based community portal to manage the utilization of mashup applications associated with the mashup platform and one or more widget contained by the mashup applications.

The management module serves two purposes. First, the management module can provide a browser based user interface for members of the MDCP to enter and describe business arrangements to the system. Second, the management module can provide an interface to an external system that is responsible for reporting utilization metrics to community participants. This programmable interface would allow such an external system component to calculate account balances for each community participate based on the content supplied to the management module. The ability to communicate utilization metrics with other MDCP components should not be underplayed. Each user participant in the MDCP has an interest in the utilization metrics of the system with respect to predefined negotiations. For example, a Widget Provider would like to "know" how many transactions (e.g., usage units) a Mashup Assembler may have accrued to date. Additionally, the same Widget Provider as well as the Service Provider would like to know if those metrics were inline with current agreements and if so what the associated revenue (e.g., monetary or bartering value) impact has on each of their MDCP system accounts, respectively.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
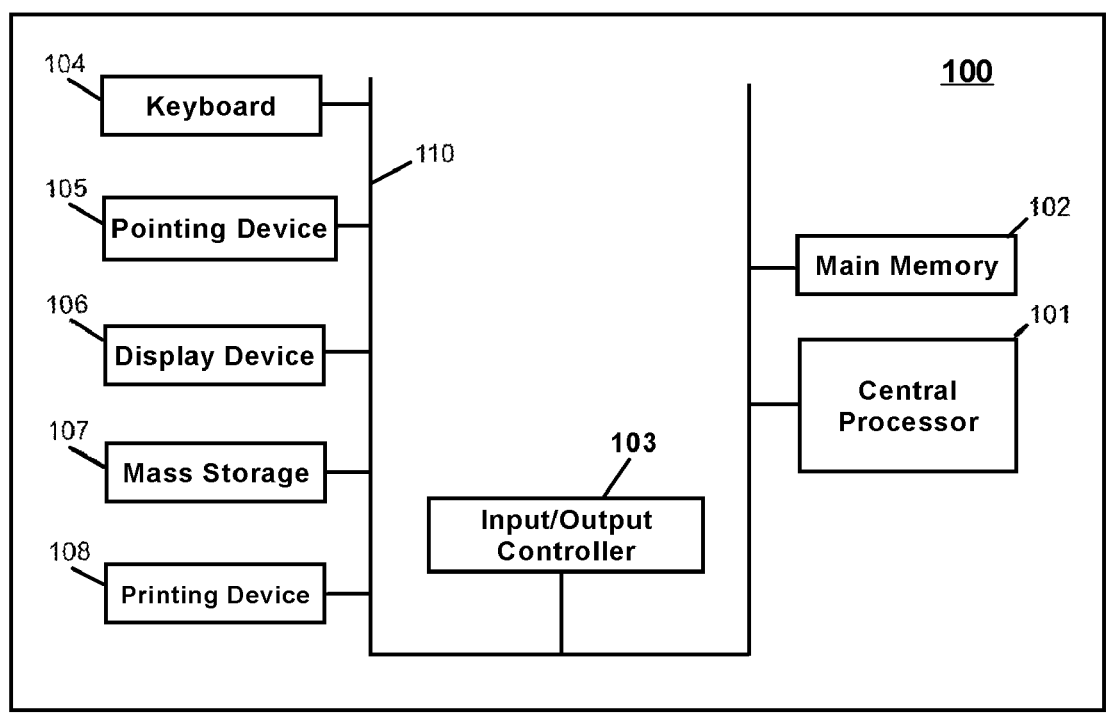
FIG. 1 illustrates a schematic view of a computer system in which the present invention may be embodied.
Figure 2:
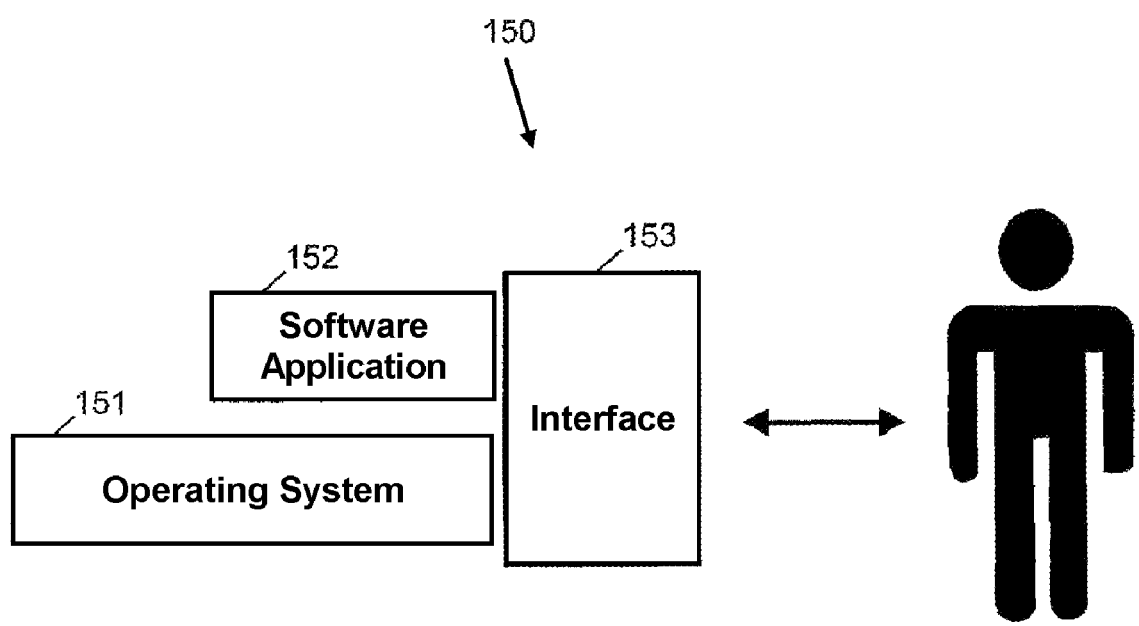
FIG. 2 illustrates a schematic view of a software system including an operating system, application software, and a user interface for carrying out the present invention.
Figure 3:
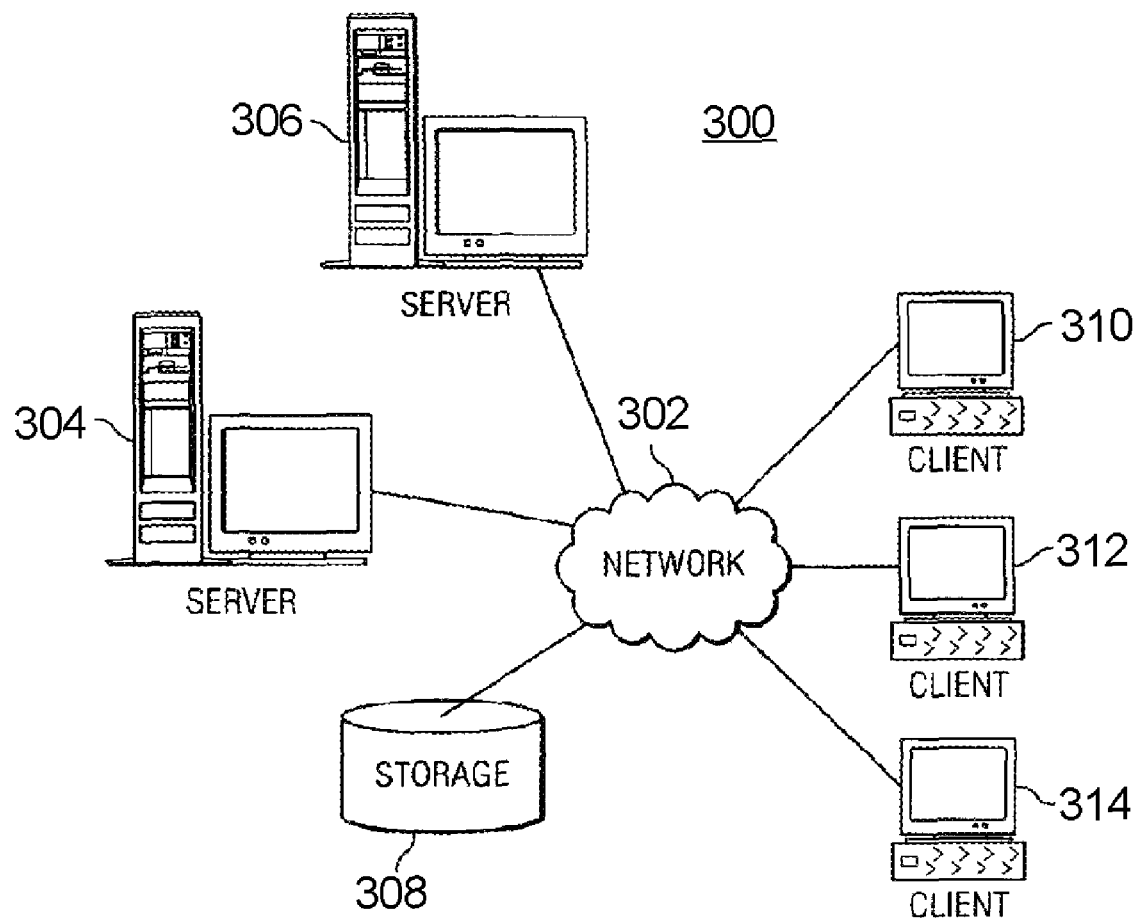
FIG. 3 depicts a pictorial representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing system 100 as desired. As illustrated, the various components of the data-processing system 100 communicate through a system bus 110 or similar architecture.

Illustrated in FIG. 2, a computer software system 150 is provided for directing the operation of the data-processing system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/or application module 152.

The interface 153, which is preferably a graphical user interface (GUI), also serves to display results, whereupon the user may supply additional inputs or terminate the session. In an embodiment, operating system 151 and interface 153 can be implemented in the context of a "Windows" system. Application module 152, on the other hand, can include instructions, such as the various operations described herein with respect to respective to the various components and modules depicted in FIG. 4.

FIG. 3 depicts a pictorial representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing system 100. Network 102 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). FIG. 1 is intended as an example, and not as an architectural limitation for different embodiments of the present invention.

The following description is presented with respect to embodiments of the present invention, which can be embodied in the context of a data-processing system such as data-processing system 100, computer software system 150 and data processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments which follows is for purposes of illustration and not considered a limitation.

Figure 4:
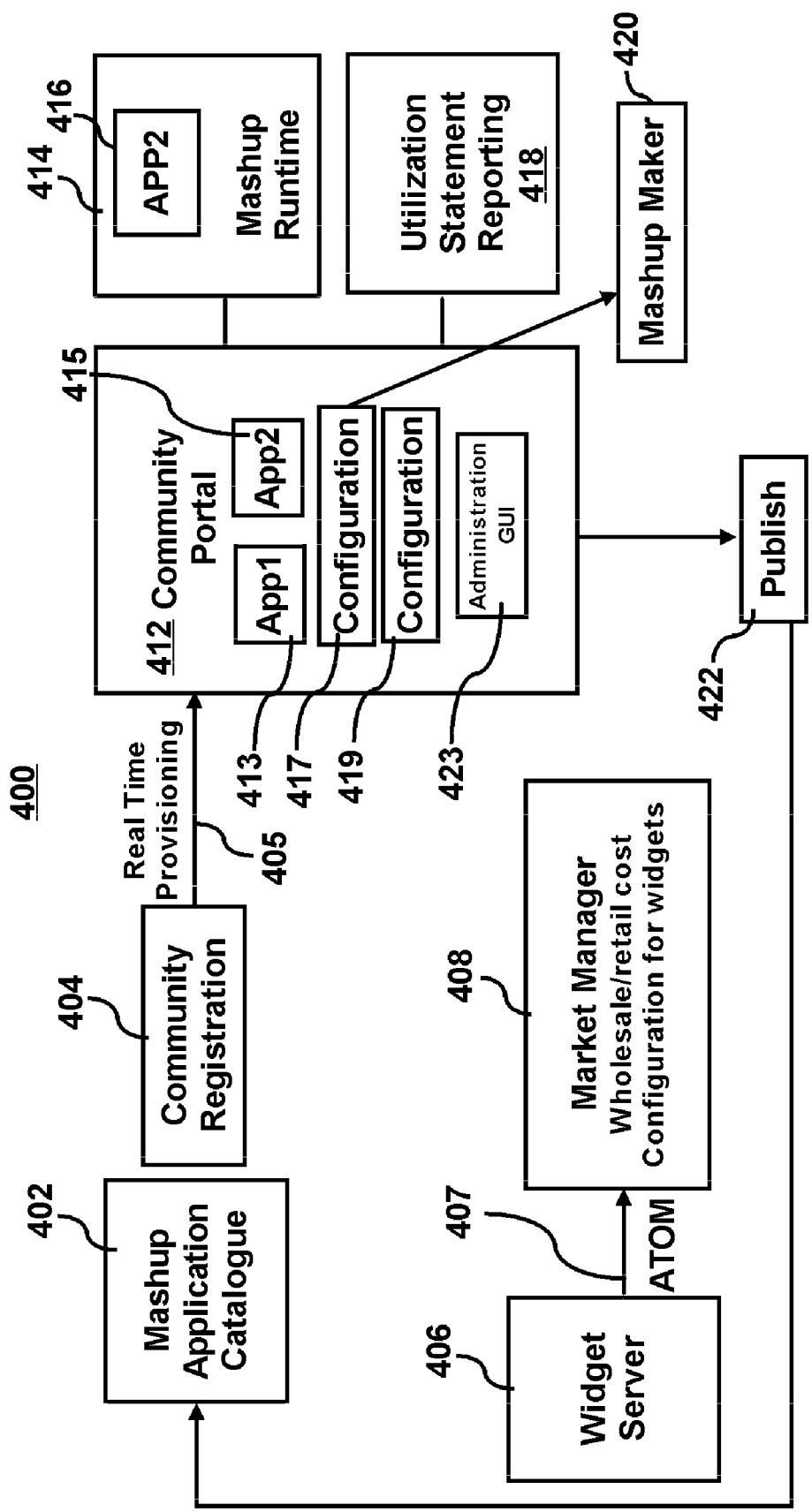
FIG. 4 illustrates a block diagram of a Market Manager system, which can be implemented in accordance with a preferred embodiment.

FIG. 4 illustrates a block diagram of a Market Manager system 400, which can be implemented in accordance with a preferred embodiment. The system 400 can be implemented in the context of a data-processing system such as system 100, computer software system 150 and/or system 300 and/or network 302 described earlier, and can be composed of a number of application modules. System 400 generally includes a Mashup Application Catalogue module 402, and a community registration module 404. Collectively, the components associated with system 400 can include a web-based community portal 412 and a Mashup Runtime 414, a Mashup Maker 420 and a Utilization Statement Reporting Unit 418. Note that components such as portal 412, Mashup Runtime 414, Mashup Maker 420, and Unit 418 can each be implemented as modules, such as application module 152 described earlier with respect to FIG. 2.

The community portal 412 can serve as a navigational registry for mashup applications such as applications 413 and 415 (e.g., App1 and App2, respectively) that have been created by community participants, These mashup application are generally composed Widgets that may be governed by pre-negotiated agreements defined in and interpreted for system 400 by the Market Manager 408. Community Portal 412 can also include specialized feature enriched GUI views into system 412. A Mashup Assembler and Mashup Enabler views are reflected by configurations 417 and 419, respectively. For example, a mashup assembler may have access to a Mashup Maker 420 but not content extraction and aggregation tools which may be more appropriately associated with a mashup enabler view. Community Portal 412 can also provide a GUI interface to a Mashup Application Catalogue 402 for all participants in the community. Finally, the portal 412 can typically include an administration GUI 423. In order to run mashup applications such as 413 and 415, which may be registered by mashup assemblers within the application catalogue 402, the portal 412 also preferably includes or has access to a Mashup Runtime Environment 414 to enable the processing of mashups created with the Mashup Maker 420. Application 416 (e.g., App 2) depicts such an example.

The portal 412 can also provide output via a publishing protocol or interface 422 for the Mashup Application Catalogue 402. System 400 further includes a Widget Server 406 that communicates with a Market Manager 408 (i.e., a management module), which in turn can receive data from the administrator 423 of the community portal 412. Note that the Widget Server 406 can be a server, such as, for example, server 304 and/or server 306 depicted in FIG. 3. Additionally, a Web feed such as ATOM feed 407 may be implemented with respect to the widget server 406 and the Market Manager 408. Note that an "ATOM Feed" is based on the term "ATOM" or "Atom" which applies to a pair of related standards. The Atom Syndication Format is an XML language used for web feeds, while the Atom Publishing Protocol (referred to as 'AtomPub' for short) is a simple HTTP-based protocol for creating and updating Web resources. The Atom Publishing Protocol (APP) is an application-level protocol for publishing and editing Web resources. The protocol is based on HTTP transport of Atom-formatted representations.

Web feeds allow software programs to check for updates published on a web site. To provide a web feed, a site owner may use specialized software (such as a content management system) that publishes a list (or "feed") of recent articles or content in a standardized, machine-readable format. The feed can then be downloaded by web sites that syndicate content from the feed, or by feed reader programs that allow Internet users to subscribe to feeds and view their content. A feed, for example, contains entries, which may be headlines, full-text articles, excerpts, summaries, and/or links to content on a web site, along with various metadata. Arrow 407 in FIG. 4 thus refers to such a web feed. Note that in FIG. 4, Real-time provisioning is generally represented in FIG. 4 by arrow 405.

Mashups as well as the widgets they contain are all software components (e.g., application module 152) that can be managed within a SaaS environment. While these widget components are more granular than a traditional SaaS application, they are consumable assets nonetheless. Given a mashup maker technology such as, for example, QEDWiki, it is possible to demonstrate how QEDWiki Mashups and Widgets can be managed within a metering environment for a SaaS Service Provider.

In the mashup ecosystem, a Service Provider of a Mashup Delivery Community Portal, such as community portal 412 depicted in FIG. 4, must consider a number of use cases associated with the various roles within the community. For example, in such a community, the Service Provider offers of a number of functions, such as, for example, provisioning and description of application offerings, registration and consumption of application offerings, metering of application utilization, utilization reporting, and registering of rating models per application offering. Another role in such a community is the Content Provider, which also features provisioning and description of application offerings, along with utilizing reporting and registration of rating models per application offering. Such a community also generally includes a Content Consumer, which features the presentment of application and rating model offerings, subscription of application offerings and the consumption of applications.

These embodiments discussed herein thus address the Market Manager 408 component of a MDCP. This market manager 408 component allows two entities (e.g., a producer and a consumer) to describe their bartering arrangement to a system, such as, for example systems 100, 300 and 400. For example, a Service Provider and a Widget Content Provider (WCP) can be configured with the ability to describe to the MDCP, their out-of-band negotiations.

Let us assume, for example, that Bob is a WCP and Jane is the Service Provider (SP). Bob owns 3 Widgets for which he will host externally on an instance of a Widget Server 406 that he maintains on his domain server. Bob normally provides access to these Widgets for a fee of 50 cents per transaction. However, since Jane has created a marketplace for the consumption of mashups and widgets, Jane is willing to sell access to Bob at a discounted rate based in blocks for usage units (transactions). They decide a priori of any activity with the Market Manager 408 that Jane will pay Bob 24 cents a usage unit for a block of 1000 units and 20 cents for any 100 unit block increments thereafter.

The payment or billing of this activity is considered out-of-band to the MDCP. Bob and Jane agree that they will use the Market Manager 408 to audit Bob's usage and purchase commitments. Based on the agreements between Bob and Jane, Bob's Widget Server (e.g., see server 406 in FIG. 4) can export via an Atom (see glossary) feed (e.g., see arrow 407 in FIG. 4) the three remote widgets as part of Jane's widget portfolio. Bartering within the system 400 does not have to be currency based. The Market Manager 408 should be flexible enough to allow for the producer and consumer to trade on credit. For example, consider a trade arrangement where a Frank (a WCP) offers George (a WCP) 2500 usage units of his widget in return for an equal 2500 units of George's widget. In this scenario, Jane (the SP) is basically a conduit for the George and Frank. In her capacity of SP, she may require the WCPs (George and Frank) to pay an infrastructure (conduit) tax for such an arrangement. In effect the Market Manager 408 would need to capture the following information:
Btax=ROUND(Brate*C wn) where
Btax=Widget Content Providers tax for a specific bartering deal
Brate=Service Providers Tax Rate
C wn=Negotiated wholesale cost of Widget(n) within the MDCP portfolio
For example, one could imagine the following arrangements:
SPJane provisions her MDCP with a Brate=10%
WCPBob owns Widget(1)
WCPFrank owns Widget(2)
WCPGeorge owns Widget(3)
SPJane buys out-of-band 1500 units of Widget(1) usage from WCPBob ($340)
SPJane has a credit of 1500 units in her account for Widget(1)
WCPFrank agrees to terms out-of-band with WCPGeorge for a 2:1 swap on their respective widgets.
WCPFrank enters a credit of 4800 units to his account for Widget(3)
WCPGeorge enters a credit of 2400 units to his account for Widget(2)

Upon confirmation from the transaction between WCP-Frank and WCPGeorge, the system credits the account for SPJane with 480 units of Widget(3) and 240 units of Widget (2). She can now sell these units to other consumers in the MDCP.

The Market Manager 408 serves two purposes. First, the Market Manager can provide a browser based user interface for members of the MDCP to enter and describe business arrangements to the system 400. Second, the Market Manager 408 can provide an interface to an external system that is responsible for reporting utilization metrics to community participants. This programmable interface would allow such an external system component to calculate account balances for each community participate based on the content supplied to the Market Manager 408.

The Market Manager 400 as described herein can actually be implemented using technology, such as, for example, IBM's QEDWiki technology as the Mashup Maker and a Software as a Service (SaaS) Utilization Management software. For example, by integrating these two assets to create an MDCP, a Service Provider can then host a complete Mashup Enablement Environment for community participants. Such integration would require the inclusion of the Market Manager 408.

Note that as utilized herein SaaS (Software as a Service) generally refers to a software application delivery model where a software vendor develops a web-native software application and hosts and operates (either independently or through a third-patty) the application for use by its customers over the Internet. Customers do not pay for owning the software itself but rather for using it. They use it through an API (Application Protocol Interface) accessible over the Web and often written using Web Services (REST or WSDL). The term SaaS has become the industry preferred term, generally replacing the earlier terms Application Service Provider (ASP), On-Demand and "Utility computing".

In the case where two organizations seek to integrate their respective technologies (e.g., Mashup Maker 420, Widget Server 406 and Community Portal 412), one party's focus and expertise may be exclusively on assisting service providers deliver software as a service to their SMB customers. Their products include self-service, provisioning, management, and billing-mediation for Service providers seeking to host, manage and meter software applications. Their end-to-end virtualization management solution can be adapted to manage the utilization of mashups and the widgets they consume.

In order to support the utilization management of mashups, modifications to a Hosting Business Suite, for example, must include changes to the offering and publishing workflow elements of their current solution. Additionally, Mashup Maker, QEDWiki, described earlier, would need to be provisioned as an application that can run in a Virtualized Data Center (VDC), such as VDC 414 of FIG. 4, and comply with the offering and publishing use cases of the desired solution. A missing component in this integration is the Market Manager 408.

It should be understood that at least some aspects of the present invention may alternatively be implemented in a computer-useable medium that contains a program product. For example, the processes and functionalities of blocks 402, 404, 408, 412, 420 and so forth as depicted in FIG. 4, can be implemented in the context of such a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Thus, the various components and modules described and illustrated herein with respect to FIG. 4 can be deployed as process software in the context of a computer system or data-processing system such as system 100 depicted in FIG. 1-2 and/or system 300 and network 302 of FIG. 3.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "computer system" or "computer system" or "computing device" includes any data processing system including, but not limited to, personal computers, servers, workstations, network computers, main flame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improve-

What is claimed is:

1. A computer-implementable method, comprising:
providing a network-based community portal having a mashup platform integrated therewith;
designating at least one pre-negotiated bartering agreement, in response to a particular user input by at least one user of said network-based community portal; and
associating a management module with a network-based community portal that permits said at least one user of said network-based community portal to describe to said mashup platform said at least one pre-negotiated bartering agreement in order to permit said network-based community portal to manage the utilization of mashup applications associated with said mashup platform and at least one widget contained by said mashup applications.

2. The computer-implementable method of claim 1 wherein said management module comprises a Market Manager.

3. The computer-implementable method of claim 1 wherein said mashup platform comprises a mashup application catalogue.

4. The computer-implementable method of claim 1 further comprising providing a server accessible by said management module for the management of said network-based community portal and said mashup platform.

5. The computer-implementable method of claim 4 wherein said server comprises a widget server.

6. The computer-implementable method of claim 1 wherein said management module comprises a browser-based user interface that permits said at least one user to enter and describe said at least one pre-negotiated bartering agreement with respect to said network-based community portal.

7. The computer-implementable method of claim 1 wherein said management module comprises an interface to an external system, said interface responsible for reporting utilization metrics to at least one member of said network-based community portal.

8. A system, comprising:
a processor;
a data bus coupled to said processor; and
a computer-usable medium embodying computer code, said computer-usable medium being coupled to said data bus, said computer program code comprising instructions executable by said processor and configured for:
providing a network-based community portal having a mashup platform integrated therewith;
designating at least one pre-negotiated bartering agreement, in response to a particular user input by at least one user of said network-based community portal; and
associating a management module with a network-based community portal that permits said at least one user of said network-based community portal to describe to said mashup platform said at least one pre-negotiated bartering agreement in order to permit said network-based community portal to manage the utilization of mashup applications associated with said mashup platform and at least one widget contained by said mashup applications.

9. The system of claim 8 wherein said management module comprises a Market Manager.

10. The system of claim 8 wherein said mashup platform comprises a mashup application catalogue.

11. The system of claim 8, wherein said instructions are further configured for:
providing a server accessible by said management module for the management of said network-based community portal and said mashup platform.

12. The system of claim 11 wherein said server comprises a widget server.

13. The system of claim 8 wherein said management module comprises a browser-based user interface that permits said at least one user to enter and describe said at least one pre-negotiated bartering agreement with respect to said network-based community portal.

14. The system of claim 8 wherein said management module comprises an interface to an external system, said interface responsible for reporting utilization metrics to at least one member of said network-based community portal.

15. A computer-usable medium embodying computer program code, said computer program code comprising computer executable instructions configured for:
providing a network-based community portal having a mashup platform integrated therewith;
designating at least one pre-negotiated bartering agreement, in response to a particular user input by at least one user of said network-based community portal; and
associating a management module with a network-based community portal that permits said at least one user of said network-based community portal to describe to said mashup platform said at least one pre-negotiated bartering agreement in order to permit said network-based community portal to manage the utilization of mashup applications associated with said mashup platform and at least one widget contained by said mashup applications.

16. The computer-usable medium of claim 15 wherein said management module comprises a Market Manager.

17. The computer-usable medium of claim 15 wherein said mashup platform comprises a mashup application catalogue.

18. The computer-usable medium of claim 15, wherein said embodied computer program code further comprises computer executable instructions configured for:
providing a server accessible by said management module for the management of said network-based community portal and said mashup platform.

19. The computer-usable medium of claim is wherein said management module comprises a browser-based user interface that permits said at least one user to enter and describe said at least one pre-negotiated bartering agreement with respect to said network-based community portal.

20. The computer-usable medium of claim 15 wherein said management module comprises an interface to an external system, said interface responsible for reporting utilization metrics to at least one member of said network-based community portal.

* * * * *